United States Patent
Sharma et al.

(10) Patent No.: US 10,694,367 B1
(45) Date of Patent: Jun. 23, 2020

(54) SUBSCRIBER DATA MANAGEMENT LOGS PARSING AND CONVERSION TO ANALYTICS USE CASES

(71) Applicant: Sprint Communications Company L.P., Overland Park, KS (US)

(72) Inventors: Anuj Sharma, Broadlands, VA (US); Ramesh Golla, Ashburn, VA (US); Anupam Vaish, Reston, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 303 days.

(21) Appl. No.: 15/870,765

(22) Filed: Jan. 12, 2018

(51) Int. Cl.
*H04W 8/18* (2009.01)
*H04L 29/08* (2006.01)
*H04L 29/06* (2006.01)
*H04L 29/12* (2006.01)

(52) U.S. Cl.
CPC ........... *H04W 8/18* (2013.01); *H04L 65/1016* (2013.01); *H04L 67/16* (2013.01); *H04L 67/22* (2013.01); *H04L 61/1523* (2013.01); *H04L 67/10* (2013.01)

(58) Field of Classification Search
CPC ...... H04W 8/18; H04L 65/1016; H04L 67/16; H04L 67/22; H04L 61/1523; H04L 67/10
See application file for complete search history.

(56) References Cited

U.S. PATENT DOCUMENTS

| | | | | |
|---|---|---|---|---|
| 6,546,387 | B1 * | 4/2003 | Triggs | H04L 43/0817 |
| 7,209,964 | B2 * | 4/2007 | Dugan | H04M 3/42136 |
| | | | | 379/221.08 |
| 2009/0006933 | A1 * | 1/2009 | Gavrilov | G06F 16/213 |
| | | | | 714/819 |
| 2014/0162706 | A1 * | 6/2014 | Daly | H04W 4/12 |
| | | | | 455/466 |
| 2014/0206315 | A1 * | 7/2014 | Mohajeri | H04W 12/06 |
| | | | | 455/411 |

* cited by examiner

*Primary Examiner* — S M A Rahman

(57) ABSTRACT

A method of building a service subscriber life-cycle data store by an application stored in a non-transitory memory of a computer system and executable by a processor of the computer system. The method comprises periodically reading wireless communication subscriber account logs from a log data store, parsing each of the logs to identify a subscriber associated with that subscriber account log, a time, and an account log type, analyzing the parsed account logs in time sequence order and based on the account log type to identify a plurality of subscriber life-cycle events, for each life-cycle event building a subscriber life-cycle entry comprising a date and time, a subscriber identity, and an identity of a subscriber life-cycle event, where each subscriber life-cycle entry corresponds to a plurality of subscriber account logs, and storing the subscriber life-cycle entry in a subscriber life-cycle data store.

20 Claims, 6 Drawing Sheets

SUBSCRIBER DATA MANAGEMENT LOGS PARSING AND CONVERSION TO ANALYTICS USE CASES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A very large data store system may be implemented as a distributed data store such that data is stored on a plurality of separate memory devices, for example separate disk drives. Such disk drives are sometimes referred to as back end data storage. Client applications may read and write the data in the distributed data stores, and the distributed data store may map these access requests to the appropriate memory devices. To avoid having to buy and deploy additional storage resources as data grows, sometimes data may be aged out and discarded to make room for new inflowing data. For example, the oldest data may be overwritten by new data. Alternatively, old data may first be deleted or marked as available for writing, and then new data may be written in the place where the old data had previously been written.

SUMMARY

In an embodiment, a method of building a wireless communication service subscriber life-cycle data store is disclosed. The method comprises periodically reading wireless communication subscriber account logs by a subscriber life-cycle event application executing on a computer system from a data store, where the wireless communication subscriber account logs are automatically generated by a plurality of wireless communication network infrastructure nodes and stored in the log data store, where the nodes are two or more of a mobility management entity (MME) node, a home subscriber server (HSS) node, a subscriber data management (SDM) node, a policy and charging rules function (PCRF) node, a packet data network gateway (PDN-GW) node, or an IP multimedia system (IMS) node and parsing each of the read subscriber account logs by the subscriber life-cycle event application to identify a subscriber, a time, and an account log type. The method further comprises, for each different subscriber associated with the parsed subscriber account logs, analyzing the parsed subscriber account logs by the subscriber life-cycle event application in time sequence order and based on the account log type to identify a plurality of subscriber life-cycle events associated with that subscriber, for each identified subscriber life-cycle event, building a subscriber life-cycle entry comprising a date and time, a subscriber identity, and an identity of a subscriber life-cycle event by the subscriber life-cycle event application, where each subscriber life-cycle entry corresponds to a plurality of subscriber account logs, and storing the subscriber life-cycle entry by the subscriber life-cycle event application in a subscriber life-cycle data store, wherein the subscriber life-cycle data store persists the subscriber life-cycle entries for a plurality of months and promotes wireless communication service provider network management operations. The method further comprises reading subscriber life-cycle entries from the subscriber life-cycle data store by a capacity analysis application executing on a computer system, analyzing the subscriber life-cycle entries by the capacity analysis application to identify a region of the wireless communication network where above average rates of wireless communication device jumping between overlapping radio access networks occurs, and adapting the wireless coverage in the identified region.

In another embodiment, a computer system for building a wireless communication service subscriber life-cycle data store is disclosed. The computer system comprises a processor, a non-transitory memory, and an application stored in the non-transitory memory. When executed by the processor, the application periodically reads wireless communication subscriber account logs from a log data store, where the wireless communication subscriber account logs are automatically generated by a plurality of wireless communication network infrastructure nodes and stored in the log data store, and parses each of the read subscriber account logs to identify a subscriber associated with that subscriber account log, a time, and an account log type. The application further, for each different subscriber associated with the parsed subscriber account logs, analyzes the parsed subscriber account logs in time sequence order and based on the account log type to identify a plurality of subscriber life-cycle events, for each identified subscriber life-cycle event, builds a subscriber life-cycle entry comprising a date and time, a subscriber identity, and an identity of a subscriber life-cycle event, where each subscriber life-cycle entry corresponds to a plurality of subscriber account logs, and stores the subscriber life-cycle entry in a subscriber life-cycle data store, wherein the subscriber life-cycle data store persists the subscriber life-cycle entries for a plurality of months and promotes wireless communication service provider network management operations.

In yet another embodiment, a method of building a wireless communication service subscriber life-cycle data store by an application stored in a non-transitory memory of a computer system and executable by a processor of the computer system is disclosed. The method comprises periodically reading wireless communication subscriber account logs from a log data store, where the wireless communication subscriber account logs are automatically generated by a plurality of wireless communication network infrastructure nodes and stored in the log data store, parsing each of the read subscriber account logs to identify a subscriber associated with that subscriber account log, a time, and an account log type, and for each different subscriber associated with the parsed subscriber account logs, analyzing the parsed subscriber account logs in time sequence order and based on the account log type to identify a plurality of subscriber life-cycle events. The method further comprises, for each identified subscriber life-cycle event, building a subscriber life-cycle entry comprising a date and time, a subscriber identity, and an identity of a subscriber life-cycle event, where each subscriber life-cycle entry corresponds to a plurality of subscriber account logs, and storing the subscriber life-cycle entry in a subscriber life-cycle data store, wherein the subscriber life-cycle data store persists the subscriber life-cycle entries for a plurality of months and promotes wireless communication service provider network management operations. The method further comprises reading subscriber life-cycle entries from the subscriber life-cycle data store by a deprovisioning confirmation application executing on a computer system and analyzing the subscriber life-cycle entries by the deprovisioning confirmation application to identify a premium service suspension event among the subscriber life-cycle entries. The method further comprises, for each identified premium service suspension life-cycle event, analyzing subscriber life-cycle entries associated with the subscriber identified in the premium service suspension life-cycle event by the deprovisioning confirmation application to identify an improperly handled message between a subscriber data management (SDM) node and one of a mobility management entity (MME) node, a policy and charging rules function (PCRF) node, an enhanced high rate packet data (eHRPD) node, an authentication authorization accounting (AAA) node, or an IMS call state control function (IMS-CSCF) node. The method further comprises, for each identified improperly handled message between the SDM node and another node, performing a root cause analysis on the improper handling of message and repairing a wireless communication system fault based on the root cause analysis.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
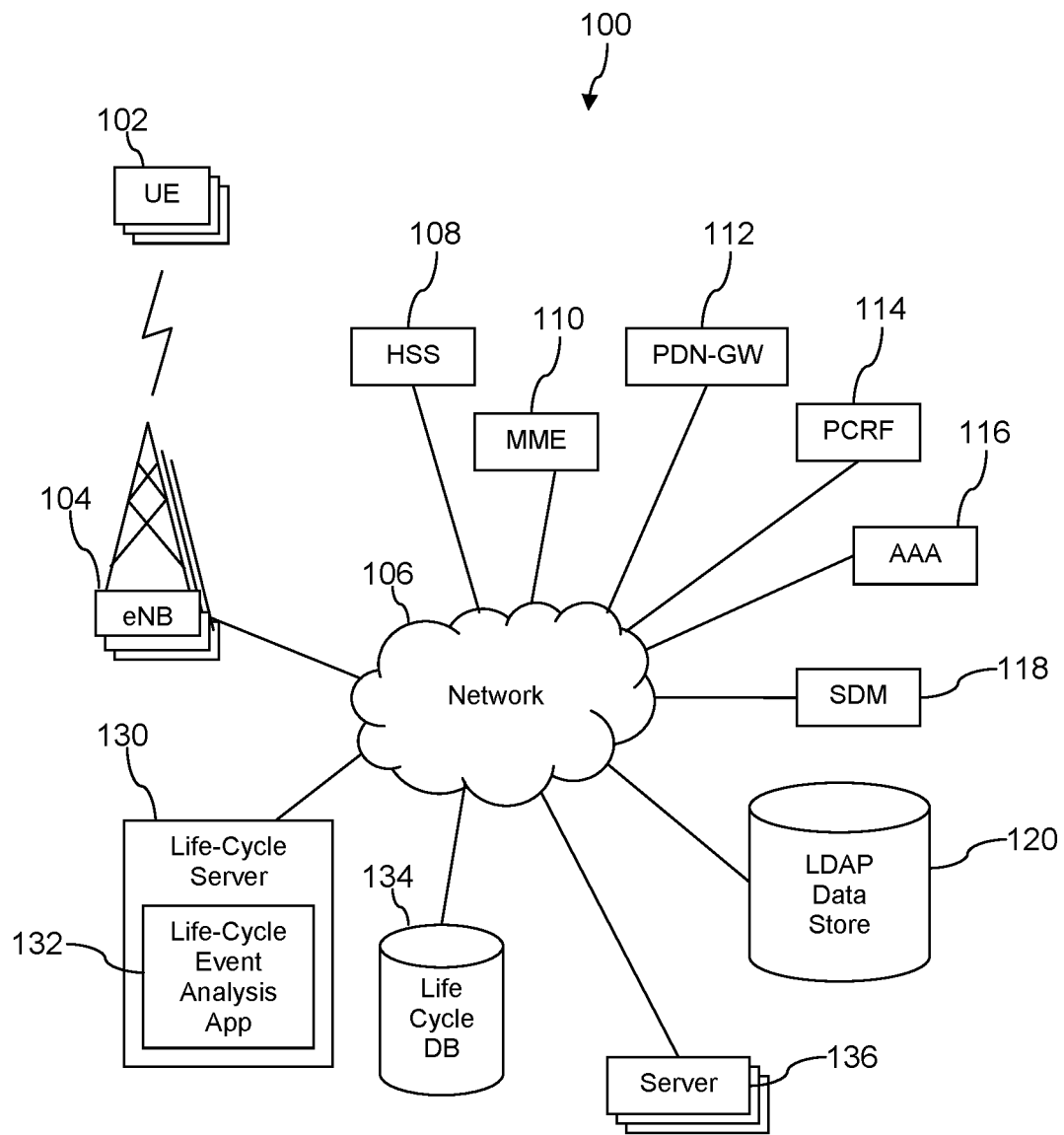
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a system that builds a subscriber life-cycle event data store that promotes several wireless communication service subscriber management functions including fraud mitigation, customer care support, and traffic engineering. The system periodically collects subscriber life-cycle event logs, parses those logs, captures the essential information from these logs, and creates life-cycle event entries in the life-cycle event data store. These life-cycle event entries are based on a plurality of different event logs and reduce the volume of the information very considerably.

The described system can be substituted for a more cumbersome and difficult to maintain system based on real-time monitoring of subscriber life-cycle events. In a wireless communication system, events that pertain to the wireless communication service subscriber life-cycle are monitored or "tapped into" on each of a plurality of network nodes such as a home subscriber server (HSS) node, mobility management entity (MME) node, a packet data network gateway (PDN-GW) node, policy and charging rules function (PCRF) node, an authentication, authorization, and accounting (AAA) node, and a subscriber data management (SDM) node. The information that is captured by the monitoring can be very voluminous, both due to the rate of influx of events and also due to the size of data associated with each event. An exemplary currently deployed monitoring system is able to persist event data for about five days before flushing the data to make room for new incoming data. Sometimes fraud investigations or customer care support may desirably access yet older subscriber event data, but that data will have been discarded by this system due to memory constraints. Another shortcoming of this real-time monitoring system is that as the event traffic grows, as it inherently tends to do over time, the equipment resources of the real-time monitoring system need to be increased, incurring a capital equipment cost to the enterprise. Yet another shortcoming of this real-time monitoring system is that the data is excessively verbose, and the various end use systems that access this data are severely challenged to extract the key details from the stored event data. The situation is like looking for a needle in a haystack.

The new system periodically retrieves subscriber life-cycle event logs from a log data store that includes event logs received from a plurality of different network nodes such as HSS nodes, MME nodes, PDN-GW nodes, PCRF nodes, AAA nodes, and SDM nodes. The system may periodically retrieve event logs that have been received by the log data store since a previous retrieval process completed, for example every four hours, every eight hours, daily, or some other interval. The retrieval interval may be adapted based on a rate of life-cycle event log influx into the log data store.

The new system parses the event logs and analyzes them according to subscriber identity and according to time, whereby to analyze related event logs together to determine a higher level event represented by a plurality of separate event logs. For example, all the event logs associated with a first international mobile subscriber identity (IMSI) may be identified and analyzed with reference to a timestamp in the event logs. The event logs that have a timestamp within seconds (5 seconds or less, as an example) may be deemed associated with the same higher level event. Related logs of the IMSI are analyzed in time order to associate them with an event category. The logs may be associated with the event category based on a log category or log type (i.e., what is the subject of the log). A new entry is created based on analysis of these associated logs to create a new entry in the subscriber life-cycle event data store that comprises the timestamp, the IMSI, and the event category. This new entry may comprise about 10 bytes of data or 20 bytes of data but may be based on thousands of bytes of data in the event logs that were parsed and analyzed to create this entry. Examples of such higher level events may be a network attach event, a network handover event, a phone as modem event, and others.

Over time, a rich collection of higher level event entries may be built in this way in the subscriber life-cycle event data store. This data store may be searched using the IMSI to perform customer care handling. For example, if a subscriber calls customer care to report a trouble with his or her wireless communication service, a customer care tool may search the subscriber life-cycle event data store with the IMSI of the subject customer, retrieve entries, and work on those entries to determine a root cause. This root cause may then be used to improve the customer's experience. As another example, the entries in the subscriber life-cycle event data store may be used to analyze performance of the network in different areas whereby to perform traffic engineering functions, for example to evaluate where to roll out additional radio access network (RAN) coverage assets. Subscriber life-cycle entries may be accessed from the subscriber life-cycle data store by a capacity analysis application executing on a computer system. The capacity analysis application may analyze the subscriber life-cycle entries to identify a region of the wireless communication network where above average rates of wireless communication device jumping between overlapping radio access networks occurs. Based on this analysis, a wireless communication service provider may then adapt the wireless coverage it provides in the identified region. This adaptation of wireless coverage may comprise one or more of adding new cell sites, adjusting antenna tilt angles on existing cell sites, adapting the antenna patterns of cell site antennas electronically and/or algorithmically through digital signal processing, adapting the transmit power levels of cell sites, or other adaptations.

As another example, in some cases "data leaks" or "service leaks" may occur, wherein premium communication services may have been provisioned for a subscriber and latter attempted to be deprovisioned, for example when a subscriber cancels the premium communication service or fails to timely pay delinquent bills for the premium communication service. Sometimes the deprovisioning action fails and the subscriber continues to receive the premium communication service erroneously. When a subscription to premium communication services is suspended (canceled subscription, failure to pay, or other reason), the subscriber data management (SDM) node initiates session teardown procedure to peer nodes, a mobility management entity (MME) node, a policy and charging rules function (PCRF) node, an enhanced high rate packet data (eHRPD) node, an authentication authorization accounting (AAA) node, and/or an IMS call state control function (IMS-CSCF) node. Improper handling of messages between the SDM and one or more of the MME, PCRF, eHRPD, AAA, or IMS-CSCF may fail to force a premium communication service session teardown and may allow continued premium service to that subscriber. In some scenarios, the life-cycle event entries in the life-cycle data store can be analyzed to provide an end-to-end view of the failed deprovisioning process to identity the node where the deprovisioning failed and further to perform root cause analysis on software executing on that node. For example, subscriber life-cycle entries may be accessed from the subscriber life-cycle data store by a deprovisioning confirmation application executing on a computer system. The deprovisioning confirmation application may periodically comb the life-cycle data associated with subscribers who have at some time been provided with a premium communication service to discover deprovisioniong failures. When such a failed deprovisioning is detected, a technician may be assigned to study the failed process more closely to identity a fault in software on some network node and thereby fix the fault.

Turning now to FIG. 1, a communication system 100 is described. In an embodiment, the system 100 comprises a plurality of user equipments (UEs) 102, a plurality of cell sites (eNBs) 104, and a network 106. Any one of the UEs 102 may be mobile phone, a smart phone, a personal digital assistant (PDA), a wearable computer, a headset computer, a media player, a laptop computer, a notebook computer, or a tablet computer. A UE 102 is configured to establish a wireless communication link with a cell site 104 according to one of a long term evolution (LTE), a code division multiple access (CDMA), a global system for mobile communication (GSM), or a worldwide interoperability for microwave access (WiMAX) wireless communication protocol. The cell site 104 is configured to provide a communication link from a UE 102 to another UE 102 or to a computer system such as a web site or content data store. The plurality of cell sites 104 may be said to establish a radio access network (RAN). The network 106 may be one or more private networks, one or more public networks, or a combination thereof.

The communication system 100 further comprises one or more home subscriber server (HSS) node 108, one or more mobility management entity (MME) node 110, one or more packet data network gateway (PDN-GW) node 112, one or more policy and charging rules function (PCRF) node 114, one or more authentication, authorization, and accounting (AAA) node 116, and one or more subscriber data management (SDM) node 118. The cell sites 104 and the nodes 108, 110, 112, 114, 116, and 118 may be considered to be part of the network 106 but are illustrated separately to support discussion of their roles in the teachings of the present disclosure.

As the UEs 102 use the network 106, subscriber life-cycle event logs are generated at one or more of the cell sites 104 and the nodes 108-118 and stored in a lightweight directory access protocol (LDAP) data store 120. For example, event logs may be generated by and stored at each node 108-118, and a script or program executing on a server (not shown) external to the nodes 108-118 copies those logs to the LDAP data store 120. Life-cycle event logs may also be generated by some of the nodes 108-118 independently of UE 102 actions, for example provisioning of services or deprovisioning of services. In an embodiment, the LDAP data store 120 may be mediated by a server computer that provides access to the LDAP data store 120 through create requests, read requests, update requests, and delete requests (CRUD requests). The LDAP data store 120, or a mediating server computer, can concurrently handle access requests from a variety of sources. The LDAP data store 120 may be implemented redundantly to promote reliability of data persistence and to promote availability of data to users. In another embodiment, the LDAP data store 120 may be implemented with a different technology, for example the data store 120 may be a relational database. In embodiment, at least 100,000 life-cycle event logs are created per second. In an embodiment, at least 250,000 life-cycle event logs are created per second. In an embodiment, during peak operating intervals as many as 500,000 life-cycle event logs may be created per second.

In an embodiment, the system 100 further comprises a life-cycle server 130 executing a life-cycle event analysis application 132 and a life-cycle data event store 134. The life-cycle event analysis application 132 periodically reads event logs from the LDAP data store 120, for example at least every four hours, every six hours, every eight hours, every twelve hours, every day, or some other interval. In an embodiment, the life-cycle event analysis application 132 may read event logs from the LDAP data store 120 after a predefined number of new event logs have accumulated in the LDAP data store 120 since the previously completed reading process has completed. The life-cycle event analysis application 132 may restrict its readings to reading only those event logs that it has not previously read. In an embodiment, the life-cycle event analysis application 132 may retain some marker or index in a memory or variable to keep track of where it last read from the LDAP data store 120 and use this in placing its next read request, for example with the read request stipulating begin reading after the index point or starting with the index point.

The life-cycle event analysis application 132 analyzes the logs based on identities and based on timestamps in the logs, consolidating the essential information contained by a plurality of associated logs (e.g., associated with the same user identity and with a proximate interval of time) to determine a higher level event that represents the plurality of associated logs. The desired information capturing the higher level event is created as an entry and stored in the life-cycle event data store 134. As an example, three event logs read from the LDAP data store 120 may be analyzed to produce a single subscriber life-cycle event entry in the life-cycle data store 134. In some cases, the life-cycle event analysis application 132 may not be able to place one or more logs into a higher level event and may drop those logs. It is noted that if the life-cycle event analysis application 132 is able to capture and persist the high level events associated with 80% of the logs read from the LDAP data store 120 while discarding 20% of the logs read, this can still be a very effective tool. In practice, the life-cycle event analysis application 132 may be able to associate at least 90% of the logs read to high level events, at least 95% of the logs read to high level events, or at least 98% of the logs read to high level events.

A first log entry may indicate that a LTE authentication procedure has taken place:
\# commitId: 2503088299 $1
\# updateStatus: success
\# userinvokeId: ffffffeeffffffa9
\# updateId: 25/10/2017 20:30:03.643550323 $ $37277
\# user: EpsUser
\# originalUser: EpsUser
\# userTransactionId: 112f0000
\# receiptTime: 25/10/2017 20:30:03.548011619
\# receiptId: 3374935393 $1
\# entryIndex: 210020647
\# parentIndex: 210021150
\# entryUpdateCounter: 2
dn: imsi=310111234244401,ds=hlr,subdata=services, uid=30298b96-b1a7-467a-9375-4053a3fe,
ds=SUBSCRIBER,o=DEFAULT,o=sprintpcs.com
changetype: modify
\# objectClass: ACSUBDATA
replace: acSeqNum
acSeqNum: 000000000042
\# acSeqNum: 000000000021

A second log entry may indicate that a LTE location update has taken place:
\# commitId: 2503088300 $1
\# updateStatus: success
\# userinvokeId: 7bffffff8b
\# updateId: 25/10/2017 20:30:03.660311535 $ $37278
\# user: EpsUser
\# originalUser: EpsUser
\# userTransactionId: 3b1f0000
\# receiptTime: 25/10/2017 20:30:03.565132747
\# receiptId: 3374935394 $1
\# entryIndex: 210019202
\# parentIndex: 210020647
\# entryUpdateCounter: 3 dn: o=hlr,imsi=310111234244401,ds=hlr,subdata=services, uid=30298b96-b1a7-467a-9375-4053a3fe,
ds=SUBSCRIBER,o=DEFAULT,o=sprintpcs.com
changetype: modify
\# objectClass: SUBINNSS
replace: ueSRVCCCapability
ueSRVCCCapability: 0
\# ueSRVCCCapability: 0

A third log entry may indicate that an LTE notify request has taken place:
\# commitId: 2503088301 $1
\# updateStatus: success
\# userInvokeId: 7cffffff8b
\# updateId: 25/10/2017 20:30:03.697879143 $ $37279
\# user: EpsUser
\# originalUser: EpsUser
\# userTransactionId: ffffffaa170000
\# receiptTime: 25/10/2017 20:30:03.602581237
\# receiptId: 3374935395 $1
\# entryIndex: 210021037
\# parentIndex: 210019202
\# entryUpdateCounter: 3
dn: subdata=eps,o=hlr,imsi=310111234244401,ds=hlr, subdata=services,uid=30298b96-b1a7-467a-9375-4053a3fe,ds=SUBSCRIBER,o=DEFAULT,
o=sprintpcs.com
changetype: modify
\# objectClass: EPSDATA
replace: epsLocUpdateTimestamp
epsLocUpdateTimestamp: 20171025203003Z
\# epsLocUpdateTimestamp: 20171025202916Z These three logs may be selected for analysis together because they are associated with the same subscriber identity (imsi=310111234244401) and they occur within a short duration of time. It is noted that what constitutes a short duration of time may be contingent on one or more of the types of events identified in the logs. Said in another way, the determination of the analysis time window may be context dependent, where the context is the sequence of events. Further, based on analysis of these three logs, based on recognizing an associated sequence of LTE authentication procedure+LTE location update+LTE notify request, the life-cycle event analysis application 132 deems that an LTE attach life-cycle event has occurred and creates and stores an entry recording that event in the event life-cycle data store 134. Such a life-cycle event entry may comprise the following content:
    imsi=310111234244401
    time=25/10/2017 20:31:59.48304894
    event=LTE attach
This information, which captures the essence of the three event logs above, may be represented in 30 bytes or less of memory. It is understood that, in an embodiment, the field names 'imsi,' 'time,' and 'event' need not actually appear in entry the life-cycle event data store 134, thereby conserving memory.

As another example, the following sequence of entries associated with a single subscriber in the life-cycle event data store 134 can provide a view into a wireless communication life-cycle of the subscriber:
    8 AM: subscriber add
    9 AM: LTE authentication
    9:00:02 AM: ehrpd authentication
    11 AM: add water polo
    11:07 AM: IMS registration
    2 PM: add phone as modem (PAM)
    2:30 PM: LTE authentication (pamsn APN)

4 PM: Hotline

11 PM: Un-hotline

11:07 PM: PCRF policy and IP write

The events listed can be interpreted by a skilled analyst or software program to arrive at the following conclusions. At about 9 AM the mobile communication device entered coverage or was in motion. At about 11:07 the device initiated a voice over WiFi call. At about 2:30 the device initiated tethering in PAM. At about 11:07 PM the device performed a LTE/CDMA authentication and IP assignment.

It will be appreciated that a large number of different log types may be analyzed and a large number of higher level life-cycle events may be derived from them. Some examples of log types are LTE authentication request, LTE update location request, LTE notification request, LTE purge request, LTE insert subscription data request, LTE delete subscriber data request, LTE cancel location request, LTE reset request, AAA server assignment request, AAA multimedia authentication request, AAA registration termination request, AAA push profile request, IMS user registration status, IMS authentication, IMS S-CSCF registration notification, IMS S-CSCF deregistration notification, IMS network initiated deregistration, IMS user location query, IMS update of user profile, PCRF data read, PCRF data update, PCRF subscription to notifications, PCRF notifications, provisioning system subscriber activation, provisioning system subscriber deactivation, provisioning system feature add, provisioning system feature removal, provisioning system subscription suspend, provisioning system subscription hotlining, provisioning system equipment swap. It is understood that this list of example log types is not intended to be exhaustive or comprehensive.

Over time the life-cycle event analysis application 132 builds a large body of entries in the life-cycle event data store 134. Various server computers 136 and/or applications executing on the server computers may access the entries in the life-cycle event data store 134 to determine patterns of wireless communication service events pertaining to one or more UEs 102. Said in another way, the analysis of the entries in the life-cycle event data store 134 can provide an end-to-end view of provisioning and access transactions over an extended period of time, for example over three months, over six months, over eight months, over a year. For example, the entries in the life-cycle event data store 134 may be analyzed by a customer care application executing on a server 136 to confirm and to troubleshoot a service problem experienced by a subscriber. For example, the entries in the life-cycle event data store 134 may be analyzed by a fraud application executing on a server 136 to identify a mechanism of service leakage (continuing to provide a premium subscription service that the subscriber has unsubscribed to). For example, the entries in the life-cycle event data store 134 may be analyzed by a traffic engineering application executing on a server 136 to identify communication traffic flows in the network 106 and plan infrastructure adaptation accordingly.

In an embodiment, a capacity analysis application executing on a server computer 136 can analyze entries in the life-cycle event data store 134 to identify network traffic trends, ranging from network registration/de-registration and other network call flows to identifying network resources occupied by a particular call flow. This analysis can further identify poor network coverage areas by identifying frequent events due to device jumping between different RANs (LTE or eHRPD networks). The capacity analysis application can use the entries in the life-cycle event data store 134 to analyze signaling storm trends (outage in the network forces millions of device to re-register at the same time causing a sudden burst of traffic hitting network elements) and impacts on platform capacity, and that information can be used to conduct capacity planning and dimensioning of network elements properly. The capacity analysis application can use the entries in the life-cycle event data store 134 to perform single point of failure analysis and deploy redundant network resources when indicated by the analysis. The capacity analysis application can analyze the entries in the life-cycle event data store 134 to monitor traffic trends and help to optimize network utilization by evenly distributing network traffic.

In an embodiment, an application executing on a server 136 can analyze the entries in the life-cycle event data store 134 to identify gaps that can result in revenue loss and data leaks. For example, provisioning transactions that added services not paid for or not bought by the subscriber, thereby resulting in free service and associated revenue loss, can be identified and remediated. For example, a premium service teardown which failed can be identified and remediated. In an embodiment, an application executing on a server 136 can analyze the entries in the life-cycle event data store 134 to track IPv4/IPv6 assignment history on a device or devices. This analysis can be used for fraud investigations and investigation of other network issues.

Figure 2A:
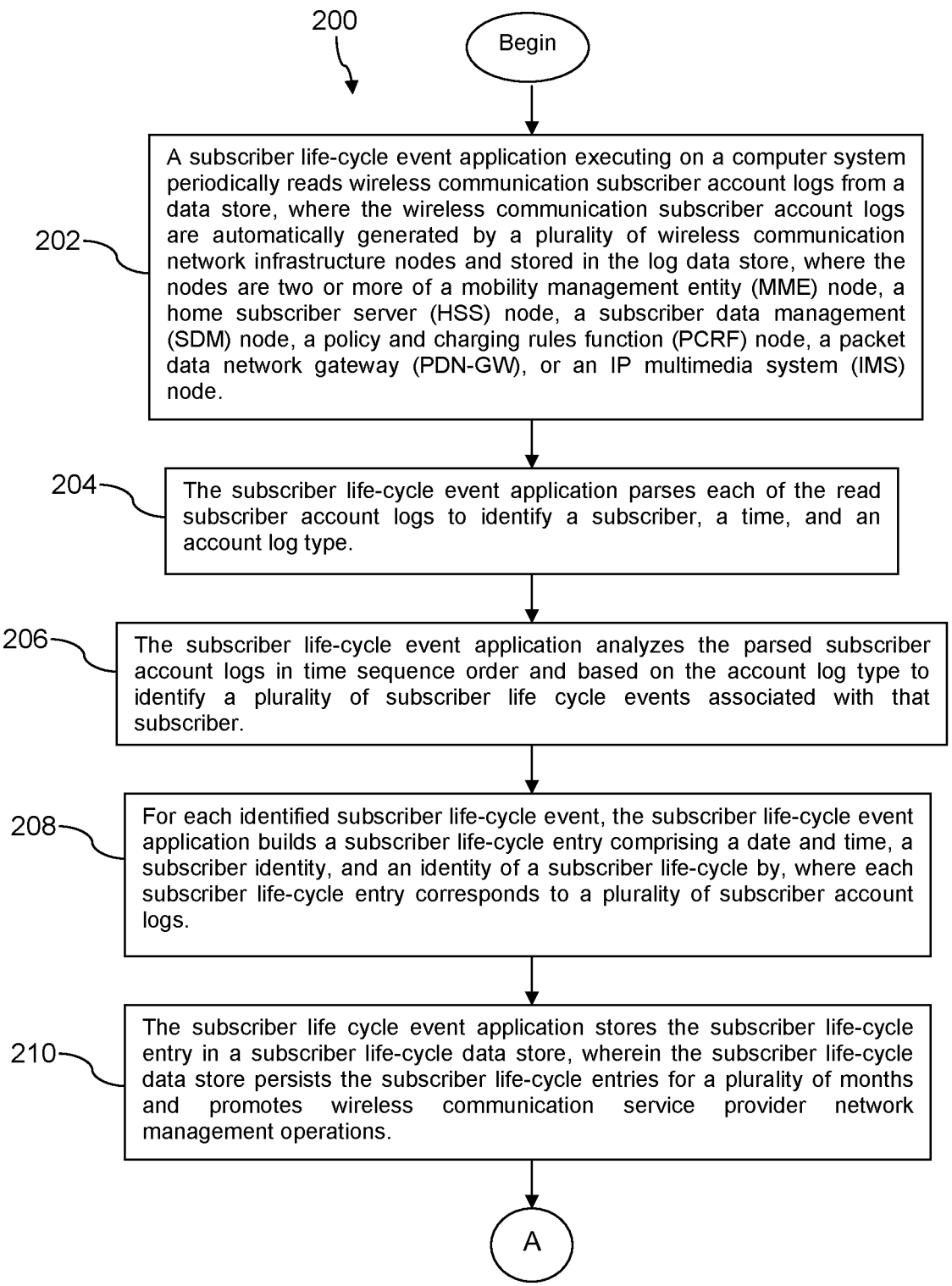
FIG. 2A and FIG. 2B is a flow chart of a method according to an embodiment of the disclosure.
Figure 2B:
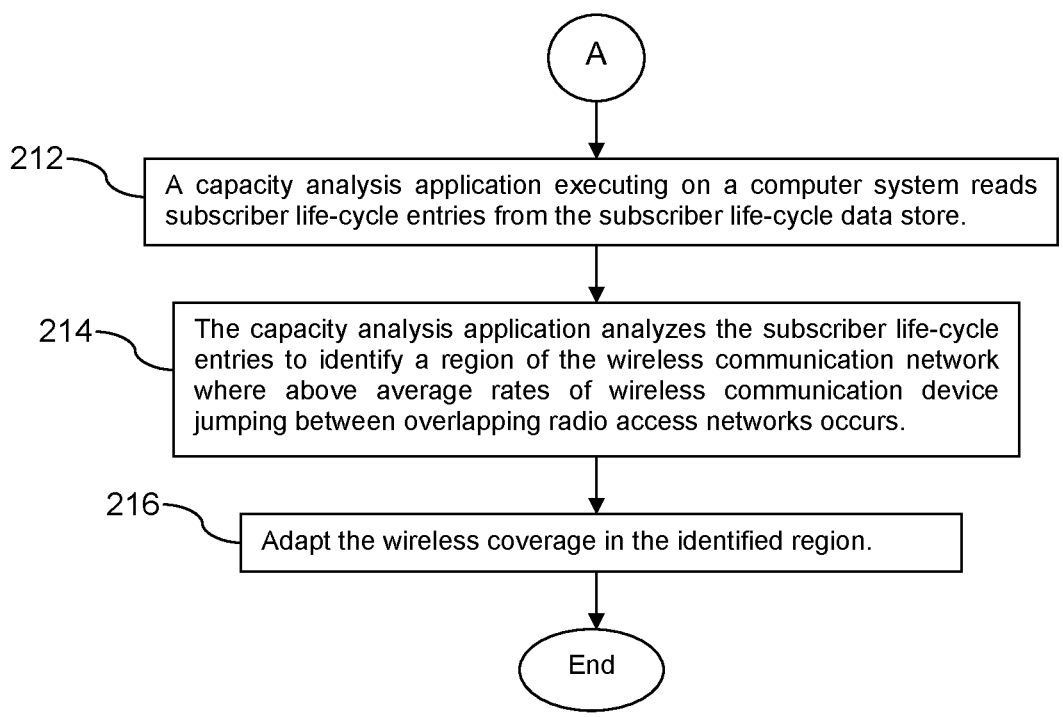

Turning now to FIG. 2A and FIG. 2B, a method 200 is described. At block 202, a subscriber life-cycle event application (i.e., the life-cycle event analysis application 132) executing on a computer system (i.e., life-cycle server 130) periodically reads wireless communication subscriber account logs from a data store, where the wireless communication subscriber account logs are automatically generated by a plurality of wireless communication network infrastructure nodes and stored in the log data store, where the nodes are two or more of a mobility management entity (MME) node, a home subscriber server (HSS) node, a subscriber data management (SDM) node, a policy and charging rules function (PCRF) node, a packet data network gateway (PDN-GW), or an IP multimedia system (IMS) node. For example, two or more of the nodes 108-118 generate wireless communication subscriber account logs (also referred to in some contexts as subscriber event logs) and write them to the LDAP data store 120. The reading of account logs may read only account logs that have been added to the LDAP data store since the previous iteration of block 202 processing. Said in other words, the processing of block 202 may read only new account logs.

At block 204, the subscriber life-cycle event application parses each of the read subscriber account logs to identify a subscriber, a time, and an account log type. The subscriber account logs may be associated with an international mobile subscriber identity (IMSI). Alternatively, the subscriber account logs may be associated with a particular subscriber with a different identity, such as a mobile equipment identity (MEID), an electronic serial number (ESN), or some other identification. At block 206, the subscriber life-cycle event application analyzes the parsed subscriber account logs in time sequence order and based on the account log type to identify a plurality of subscriber life-cycle events associated with that subscriber. At block 208, for each identified subscriber life-cycle event, the subscriber life-cycle event application builds a subscriber life-cycle entry comprising a date and time, a subscriber identity, and an identity of a subscriber life-cycle by, where each subscriber life-cycle entry corresponds to a plurality of subscriber account logs.

At block 210, the subscriber life-cycle event application stores the subscriber life-cycle entry in a subscriber life-cycle event data store, wherein the subscriber life-cycle event data store persists the subscriber life-cycle entries for a plurality of months and promotes wireless communication service provider network management operations. At block 212, a capacity analysis application executing on a computer system reads subscriber life-cycle entries from the subscriber life-cycle event data store.

At block 214, the capacity analysis application analyzes the subscriber life-cycle entries to identify a region of the wireless communication network where above average rates of wireless communication device jumping between overlapping radio access networks occurs. At block 216, adapt the wireless coverage in the identified region.

Alternatively, rather than the processing of blocks 212, 214, 216, a different analysis application may access the subscriber life-cycle entries from the subscriber life-cycle event data store and perform a customer care function, such as troubleshooting and/or root cause analysis, such as performing data leakage analysis, such as performing fraud investigation, or other analysis. Based on the completed analysis, a subscriber service problem may be remediated, a data leak may be patched, a fraud may be prevented.

Figure 3A:
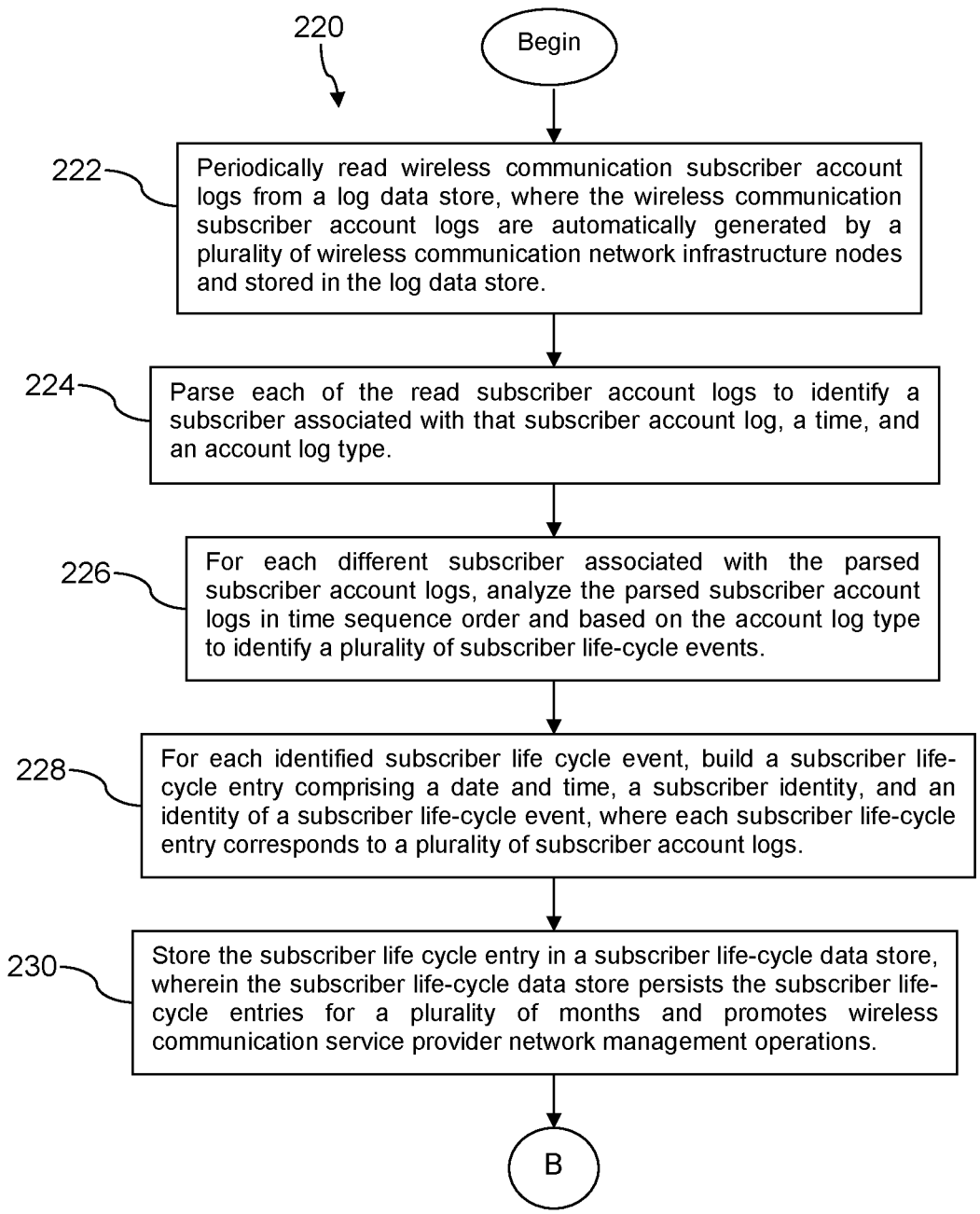
FIG. 3A and FIG. 3B is a flow chart of another method according to an embodiment of the disclosure.
Figure 3B:
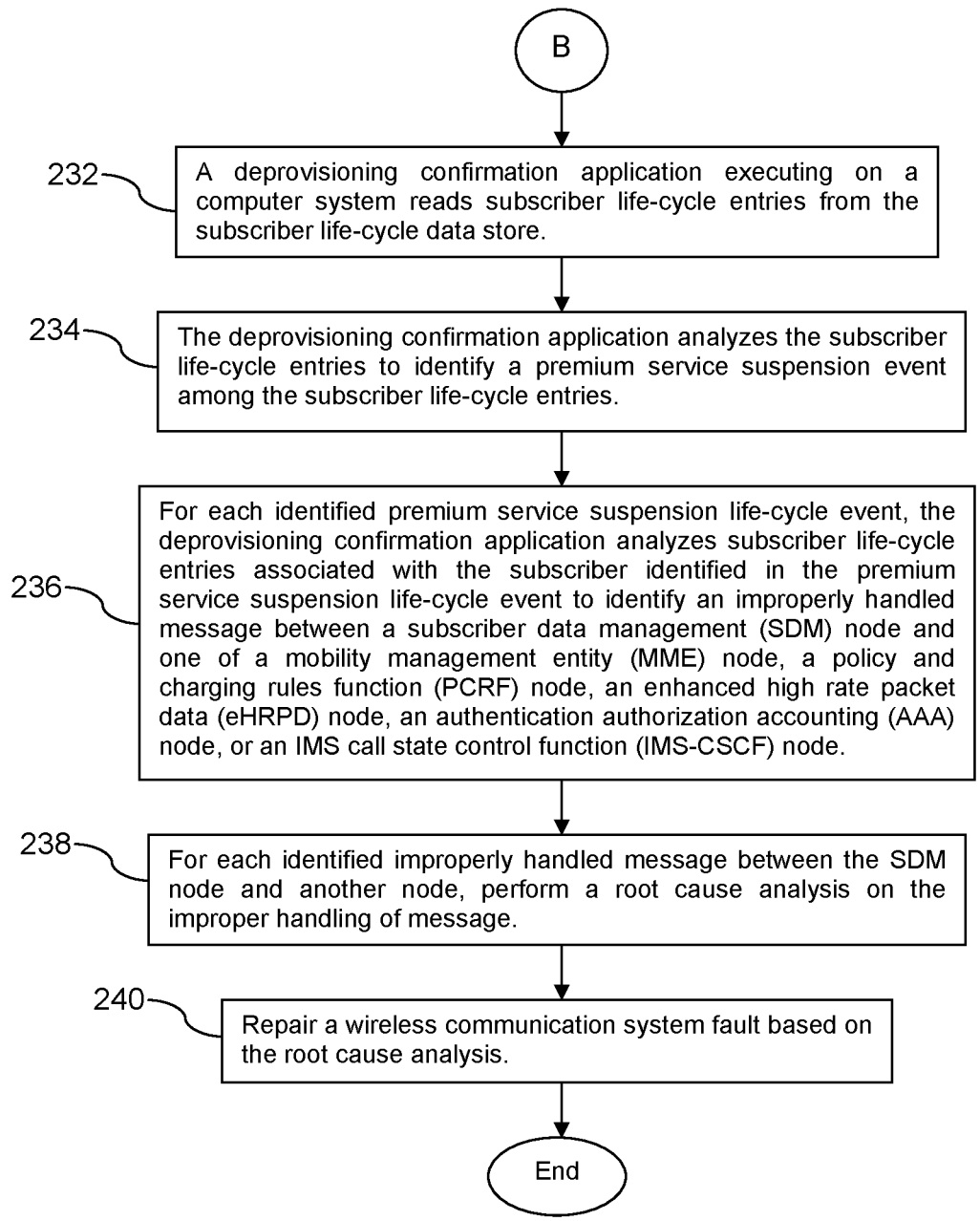

Turning now to FIG. 3A and FIG. 3B a method 220 is described. In an embodiment, the life-cycle event analysis application 132 executing on the life-cycle server 130 may perform the processing of method 220. At block 222, periodically read wireless communication subscriber account logs from a log data store, where the wireless communication subscriber account logs are automatically generated by a plurality of wireless communication network infrastructure nodes and stored in the log data store. At block 224, parse each of the read subscriber account logs to identify a subscriber associated with that subscriber account log, a time, and an account log type.

At block 226, for each different subscriber associated with the parsed subscriber account logs, analyze the parsed subscriber account logs in time sequence order and based on the account log type to identify a plurality of subscriber life-cycle events.

At block 228, for each identified subscriber life-cycle event, build a subscriber life-cycle entry comprising a date and time, a subscriber identity, and an identity of a subscriber life-cycle event, where each subscriber life-cycle entry corresponds to a plurality of subscriber account logs.

At block 230, store the subscriber life-cycle entry in a subscriber life-cycle data store, wherein the subscriber life-cycle data store persists the subscriber life-cycle entries for a plurality of months and promotes wireless communication service provider network management operations.

At block 232, a deprovisioning confirmation application executing on a computer system reads subscriber life-cycle entries from the subscriber life-cycle data store. At block 234, the deprovisioning confirmation application analyzes the subscriber life-cycle entries to identify a premium service suspension event among the subscriber life-cycle entries. In an embodiment, the deprovisioning confirmation application may only analyze life-cycle entries associated with subscribers known to have previously subscribed to a premium communication service. This preselection of life-cycle entries to analyze may make the processing burden for the deprovisioning confirmation application lighter. In an embodiment, the deprovisioning confirmation application may execute periodically, for example once per week, once per month, once per quarter, or on some other periodic basis. In an embodiment, the deprovisioning confirmation application may maintain a list of subscribers who have once subscribed to a premium communication service and delete the subscriber from that list once the deprovisioning confirmation process described below has completed. Said in other words, the deprovisioning confirmation application may confirm deprovisioning only once for a subscriber for a given subscription for premium service.

At block 236, for each identified premium service suspension life-cycle event, the deprovisioning confirmation application analyzes subscriber life-cycle entries associated with the subscriber identified in the premium service suspension life-cycle event to identify an improperly handled message between a subscriber data management (SDM) node and one of a mobility management entity (MME) node, a policy and charging rules function (PCRF) node, an enhanced high rate packet data (eHRPD) node, an authentication authorization accounting (AAA) node, or an IMS call state control function (IMS-CSCF) node. If the deprovisioning confirmation application finds no improperly handled message, the premium service deprovisioning process for that subscriber may be deemed to have been completed successfully.

At block 238, for each identified improperly handled message between the SDM node and another node, perform a root cause analysis on the improper handling of message. At block 240, repair a wireless communication system fault based on the root cause analysis. The processing of blocks 238 and 240 may be performed by human beings, for example by technicians, engineers, or information technology (IT) specialists.

Figure 4:
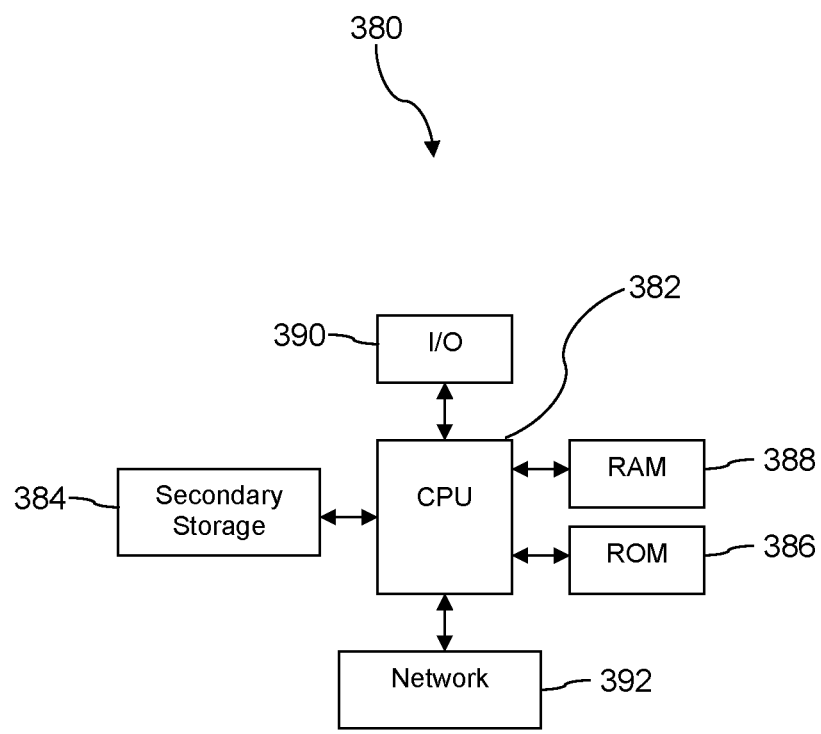
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of building a wireless communication service subscriber life-cycle data store, comprising:

periodically reading wireless communication subscriber account logs by a subscriber life-cycle event application executing on a computer system from a data store, where the wireless communication subscriber account logs are automatically generated by a plurality of wireless communication network infrastructure nodes and stored in the log data store, where the nodes are two or more of a mobility management entity (MME) node, a home subscriber server (HSS) node, a subscriber data management (SDM) node, a policy and charging rules function (PCRF) node, a packet data network gateway (PDN-GW) node, or an IP multimedia system (IMS) node;

parsing each of the read subscriber account logs by the subscriber life-cycle event application to identify a subscriber by a subscriber identity, a time, and an account log type;

based on the parsing, identifying any subscriber account logs associated with the subscriber identity by the subscriber life-cycle event application;

analyzing the parsed subscriber account logs associated with the subscriber identity by the subscriber life-cycle event application in time sequence order and based on the account log type to identify a plurality of subscriber life-cycle events associated with that subscriber;

for each identified subscriber life-cycle event, building a subscriber life-cycle entry comprising a date and time, the subscriber identity, and an identity of a subscriber life-cycle event by the subscriber life-cycle event application, where each subscriber life-cycle entry corresponds to and consolidates a plurality of subscriber account logs, and where each subscriber life-cycle entry comprises less content than the corresponding plurality of subscriber account logs;

storing the subscriber life-cycle entry by the subscriber life-cycle event application in a subscriber life-cycle data store, wherein the subscriber life-cycle data store persists the subscriber life-cycle entries for a plurality of months and promotes wireless communication service provider network management operations;

reading subscriber life-cycle entries from the subscriber life-cycle data store by a capacity analysis application executing on a computer system;

analyzing the subscriber life-cycle entries by the capacity analysis application to identify a region of the wireless communication network where above average rates of wireless communication device jumping between overlapping radio access networks occurs; and adapting the wireless coverage in the identified region.

2. The method of claim 1, wherein the subscriber account logs are associated with wireless communication service to mobile communication devices, where each mobile communication device is one of a mobile phone, a smart phone, a personal digital assistant (PDA), a wearable computer, a headset computer, a media player, a laptop computer, a notebook computer, or a tablet computer.

3. The method of claim 2, wherein each mobile communication device is configured to receive wireless communication service according to a long term evolution (LTE), a code division multiple access (CDMA), a global system for mobile communication (GSM), or a worldwide interoperability for microwave access (WiMAX) wireless communication protocol.

4. The method of claim 1, further comprising:
reading subscriber life cycle event entries from the subscriber life-cycle event data store by a customer care application executing on a computer system;
analyzing the subscriber life-cycle event entries by the customer care application;
based on the analysis of the customer care application, Identifying a root cause of a service trouble experienced by a mobile communication device; and
remediating the root cause of the service trouble.

5. The method of claim 1, wherein the account log types comprise a LTE authentication request, a LTE update location request, a LTE notification request, a LTE purge request, a LTE insert subscription data request, a LTE delete subscriber data request, a LTE cancel location request, and a LTE reset request.

6. The method of claim 1, wherein the account lot types comprise an IMS user registration status, an IMS authentication, an IMS S-CSCF registration notification, an IMS S-CSCF deregistration notification, an IMS network initiated deregistration, an IMS user location query, and an IMS update of user profile.

7. The method of claim 1, wherein the account log types comprise a provisioning system subscriber activation, a provisioning system subscriber deactivation, a provisioning system feature add, a provisioning system feature removal, a provisioning system subscription suspend, a provisioning system subscription hotlining, and a provisioning system equipment swap.

8. A computer system for building a wireless communication service subscriber life-cycle data store, comprising:
a processor;
a non-transitory memory; and
an application stored in the non-transitory memory that, when executed by the processor,
periodically reads wireless communication subscriber account logs from a log data store, where the wireless communication subscriber account logs are automatically generated by a plurality of wireless communication network infrastructure nodes and stored in the log data store;
parses each of the read subscriber account logs to identify a subscriber associated with that subscriber account log, a time, and an account log type;
based on the parsing, identifies any subscriber account logs associated with the subscriber identity;
analyzes the parsed subscriber account logs associated with the subscriber identity in time sequence order and based on the account log type to identify a plurality of subscriber life-cycle events;
for each identified subscriber life-cycle event, builds a subscriber life-cycle entry comprising a date and time, the subscriber identity, and an identity of a subscriber life-cycle event, where each subscriber life-cycle entry corresponds to and consolidates a plurality of subscriber account logs, and where each subscriber life-cycle entry comprises less content than the corresponding plurality of subscriber account logs; and
stores the subscriber life-cycle entry in a subscriber life-cycle data store,
wherein the subscriber life-cycle data store persists the subscriber life-cycle entries for a plurality of months and promotes wireless communication service provider network management operations.

9. The computer system of claim 8, where the wireless communication network infrastructure nodes are two or more of a mobility management entity (MME) node, a home subscriber server (HSS) node, a subscriber data management (SDM) node, a policy and charging rules function (PCRF) node, a packet data network gateway (PDN-GW) node, or an IP multimedia system (IMS) node.

10. The computer system of claim 8, wherein the subscriber is identified based on reading one of an international mobile subscriber identity (IMSI), a mobile equipment identity (MEID), or an electronic serial number (ESN) in the subscriber account logs.

11. The computer system of claim 8, wherein the log data store is a lightweight directory access protocol (LDAP) data store.

12. The computer system of claim 8, wherein the log data store is a relational database.

13. The computer system of claim 8, wherein the application reads the wireless communication subscriber account logs from the log data store at least every four hours.

14. The computer system of claim 8, wherein the application reads the wireless communication subscriber account logs from the log data store at least every twelve hours.

15. A method of building a wireless communication service subscriber life-cycle data store by an application stored in a non-transitory memory of a computer system and executable by a processor of the computer system, comprising:
periodically reading wireless communication subscriber account logs from a log data store, where the wireless communication subscriber account logs are automatically generated by a plurality of wireless communication network infrastructure nodes and stored in the log data store;
parsing each of the read subscriber account logs to identify a subscriber associated with that subscriber account log, a time, and an account log type;
based on the parsing, identifying any subscriber account logs associated with the subscriber identity;
analyzing the parsed subscriber account logs associated with the subscriber identity in time sequence order and based on the account log type to identify a plurality of subscriber life-cycle events;
for each identified subscriber life-cycle event, building a subscriber life-cycle entry comprising a date and time, a subscriber identity, and an identity of a subscriber life-cycle event, where each subscriber life-cycle entry corresponds to and consolidates a plurality of subscriber account logs, and where each subscriber life-cycle entry comprises less content than the corresponding plurality of subscriber account logs;
storing the subscriber life-cycle entry in a subscriber life-cycle data store, wherein the subscriber life-cycle data store persists the subscriber life-cycle entries for a plurality of months and promotes wireless communication service provider network management operations;
reading subscriber life-cycle entries from the subscriber life-cycle data store by a deprovisioning confirmation application executing on a computer system;
analyzing the subscriber life-cycle entries by the deprovisioning confirmation application to identify a premium service suspension event among the subscriber life-cycle entries;
for each identified premium service suspension life-cycle event, analyzing subscriber life-cycle entries associated with the subscriber identified in the premium service suspension life-cycle event by the deprovisioning confirmation application to identify an improperly handled message between a subscriber data management (SDM) node and one of a mobility management entity (MME) node, a policy and charging rules function (PCRF) node, an enhanced high rate packet data (eH-RPD) node, an authentication authorization accounting (AAA) node, or an IMS call state control function (IMS-CSCF) node;

for each identified improperly handled message between the SDM node and another node, performing a root cause analysis on the improper handling of message; and repairing a wireless communication system fault based on the root cause analysis.

16. The method of claim 15, wherein the log data store is a lightweight directory access protocol (LDAP) data store.

17. The method of claim 15, wherein the log data store is a relational database.

18. The method of claim 15, wherein the account event category comprise LTE authentication request, LTE update location request, LTE notification request, LTE purge request, LTE insert subscription data request, LTE delete subscriber data request, LTE cancel location request, LTE reset request, AAA server assignment request, AAA multimedia authentication request, AAA registration termination request, AAA push profile request, IMS user registration status, IMS authentication, IMS S-CSCF registration notification, IMS S-CSCF deregistration notification, IMS network initiated deregistration, IMS user location query, IMS update of user profile, PCRF data read, PCRF data update, PCRF subscription to notifications, PCRF notifications, provisioning system subscriber activation, provisioning system subscriber deactivation, provisioning system feature add, provisioning system feature removal, provisioning system subscription suspend, provisioning system subscription hotlining, and provisioning system equipment swap event categories.

19. The method of claim 15, further comprising:

reading subscriber life-cycle entries from the subscriber life-cycle data store by a capacity analysis application executing on a computer system;

analyzing the subscriber life-cycle entries by the capacity analysis application to identify a region of the wireless communication network where above average rates of wireless communication device jumping between overlapping radio access networks occurs; and adapting the wireless coverage in the identified region.

20. The method of claim 15, further comprising:

reading subscriber life cycle event entries from the subscriber life-cycle event data store by a customer care application executing on a computer system;

analyzing the subscriber life-cycle event entries by the customer care application;

based on the analysis of the customer care application, Identifying a root cause of a service trouble experienced by a mobile communication device; and remediating the root cause of the service trouble.

* * * * *